(12) United States Patent
Campos

(10) Patent No.: US 9,385,811 B2
(45) Date of Patent: Jul. 5, 2016

(54) OPTICAL COMMUNICATION SYSTEMS AND METHODS

(71) Applicant: Cable Television Laboratories, Inc., Louisville, CO (US)

(72) Inventor: Luis Alberto Campos, Superior, CO (US)

(73) Assignee: Cable Television Laboratories, Inc, Louisville, CO (US)

(*) Notice: Subject to any disclaimer, the term of this patent is extended or adjusted under 35 U.S.C. 154(b) by 65 days.

(21) Appl. No.: 14/322,078

(22) Filed: Jul. 2, 2014

(65) Prior Publication Data

US 2015/0295653 A1  Oct. 15, 2015

Related U.S. Application Data

(60) Provisional application No. 61/912,699, filed on Dec. 6, 2013.

(51) Int. Cl.

| H04J 14/00 | (2006.01) |
|---|---|
| H04B 10/27 | (2013.01) |
| H04B 10/2575 | (2013.01) |
| H04B 10/516 | (2013.01) |
| H04B 10/61 | (2013.01) |
| H04J 14/02 | (2006.01) |
| H04B 10/50 | (2013.01) |

(Continued)

(52) U.S. Cl.
CPC ............ *H04B 10/27* (2013.01); *H04B 10/2575* (2013.01); *H04B 10/2587* (2013.01); *H04B 10/25751* (2013.01); *H04B 10/503* (2013.01); *H04B 10/516* (2013.01); *H04B 10/61* (2013.01); *H04J 14/02* (2013.01); *H04L 27/34* (2013.01)

(58) Field of Classification Search
CPC .. H04B 10/27; H04B 10/2575; H04B 10/516; H04B 10/275; H04B 10/035; H04B 10/25751; H04B 10/2587; H04B 10/503; H04B 10/61; H04B 10/40; H04J 14/02; H04J 14/0283; H04L 27/34
USPC ........... 398/59, 66, 67, 70–72, 188, 183, 185, 398/186, 154, 155
See application file for complete search history.

(56) References Cited

U.S. PATENT DOCUMENTS

| 5,058,101 A | 10/1991 | Albanese et al. | |
|---|---|---|---|
| 5,717,795 A * | 2/1998 | Sharma | H04B 10/506 385/16 |
| 5,999,287 A * | 12/1999 | Davies | H04J 14/08 398/1 |

(Continued)

*Primary Examiner* — Hibret Woldekidan
(74) *Attorney, Agent, or Firm* — Duft Bornsen & Fettig LLP

(57) ABSTRACT

Systems and methods presented herein provide for optical communications. In one embodiment, a communication system includes a plurality of communication nodes and a communication hub. A bundle of optical fibers optically links the nodes to the communication hub. The communication hub includes a laser operable to propagate unmodulated laser light to a first node along a first of the optical fibers in the bundle. The first node is operable to modulate the laser light with a first modulating signal source, and to propagate the modulated laser light to a second node. The second node is communicatively coupled to a second modulating signal source and to the first node. The second node is operable to optically combine upstream communications from the second modulating signal source with the modulated laser light from the first node, and to propagate the modulated laser light with the upstream communications to the communication hub at a same carrier wavelength.

12 Claims, 13 Drawing Sheets

(51) Int. Cl.
*H04B 10/2587* (2013.01)
*H04L 27/34* (2006.01)

(56) References Cited

U.S. PATENT DOCUMENTS

| | | | |
|---|---|---|---|
| 6,175,672 | B1 | 1/2001 | Newberg et al. |
| 6,295,148 | B1 | 9/2001 | Atlas |
| 6,466,342 | B1 * | 10/2002 | Frigo .................. H04B 10/271 398/82 |
| 7,099,586 | B2 | 8/2006 | Yoo |
| 7,103,277 | B2 | 9/2006 | Ridgway |
| 7,261,162 | B2 | 8/2007 | Deans et al. |
| 7,340,172 | B2 * | 3/2008 | Giles .................. H04J 14/0227 398/75 |
| 7,366,417 | B2 | 4/2008 | Feuer et al. |
| 7,831,146 | B2 | 11/2010 | Mazed |
| 8,699,875 | B2 * | 4/2014 | Bravi .................. G01M 11/332 398/1 |
| 9,143,234 | B2 * | 9/2015 | Campos ............... H04B 10/27 |
| 9,166,700 | B2 * | 10/2015 | Gripp .................. H04B 10/61 |
| 2003/0223669 | A1 | 12/2003 | Enokihara et al. |
| 2004/0253003 | A1 * | 12/2004 | Farmer ............... H04N 7/17309 398/214 |
| 2006/0127093 | A1 | 6/2006 | Park et al. |
| 2006/0257151 | A1 | 11/2006 | Zami et al. |
| 2007/0133998 | A1 * | 6/2007 | Xia .................... H04B 10/40 398/155 |
| 2008/0056727 | A1 * | 3/2008 | Nishihara ........... H04B 10/505 398/155 |
| 2009/0074421 | A1 | 3/2009 | Thaniyavarn |
| 2009/0269059 | A1 | 10/2009 | Genay et al. |
| 2009/0274462 | A1 | 11/2009 | Yu |
| 2010/0202785 | A1 * | 8/2010 | Kawanishi ......... H04B 10/5053 398/185 |
| 2011/0158644 | A1 | 6/2011 | Cavaliere et al. |
| 2011/0229137 | A1 * | 9/2011 | Gripp .................. H04B 10/61 398/65 |
| 2012/0155888 | A1 | 6/2012 | Ji et al. |
| 2012/0189308 | A1 | 7/2012 | Watanabe |
| 2012/0224855 | A1 | 9/2012 | Liu et al. |
| 2014/0308039 | A1 | 10/2014 | Sun et al. |
| 2016/0006507 | A1 * | 1/2016 | Campos ............. H04B 10/2504 398/65 |

\* cited by examiner

OPTICAL COMMUNICATION SYSTEMS AND METHODS

CROSS REFERENCE TO RELATED APPLICATIONS

This patent application is a non-provisional patent application claiming priority to, and thus the benefit of an earlier filing date from, U.S. Provisional Patent Application No. 61/912,699 (filed Dec. 6, 2013), the entire contents of which are hereby incorporated by reference. This patent application is also related to U.S. patent application Ser. Nos. 14/322,063 and 14/322,093 (filed Jul. 2, 2014), the entire contents of each of which are also incorporated by reference.

BACKGROUND

Higher capacity optical links (e.g., 20 GHz to 30 GHz) place greater demands on directly modulated diode lasers. Wavelength division multiplexing provides some relief for these demands. Newer diode lasers are more stable and exhibit narrower linewidths that make coherent optical communications more practical to implement. But, increasing demands for data continue to present problems in optical communications. And, these newer technologies are not always feasible to implement.

SUMMARY

Systems and methods presented herein provide for optical communications. In one embodiment, a communication system includes a plurality of communication nodes and a communication hub. A bundle of optical fibers optically links the nodes to the communication hub. The communication hub includes a laser operable to propagate unmodulated laser light to a first node along a first of the optical fibers in the bundle. The first node is operable to modulate the laser light with a first modulating signal source, and to propagate the modulated laser light to a second node. The second node is communicatively coupled to a second modulating signal source and to the first node. The second node is operable to optically combine upstream communications from the second modulating signal source with the modulated laser light from the first node, and to propagate the modulated laser light with the upstream communications to the communication hub at a same carrier wavelength.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
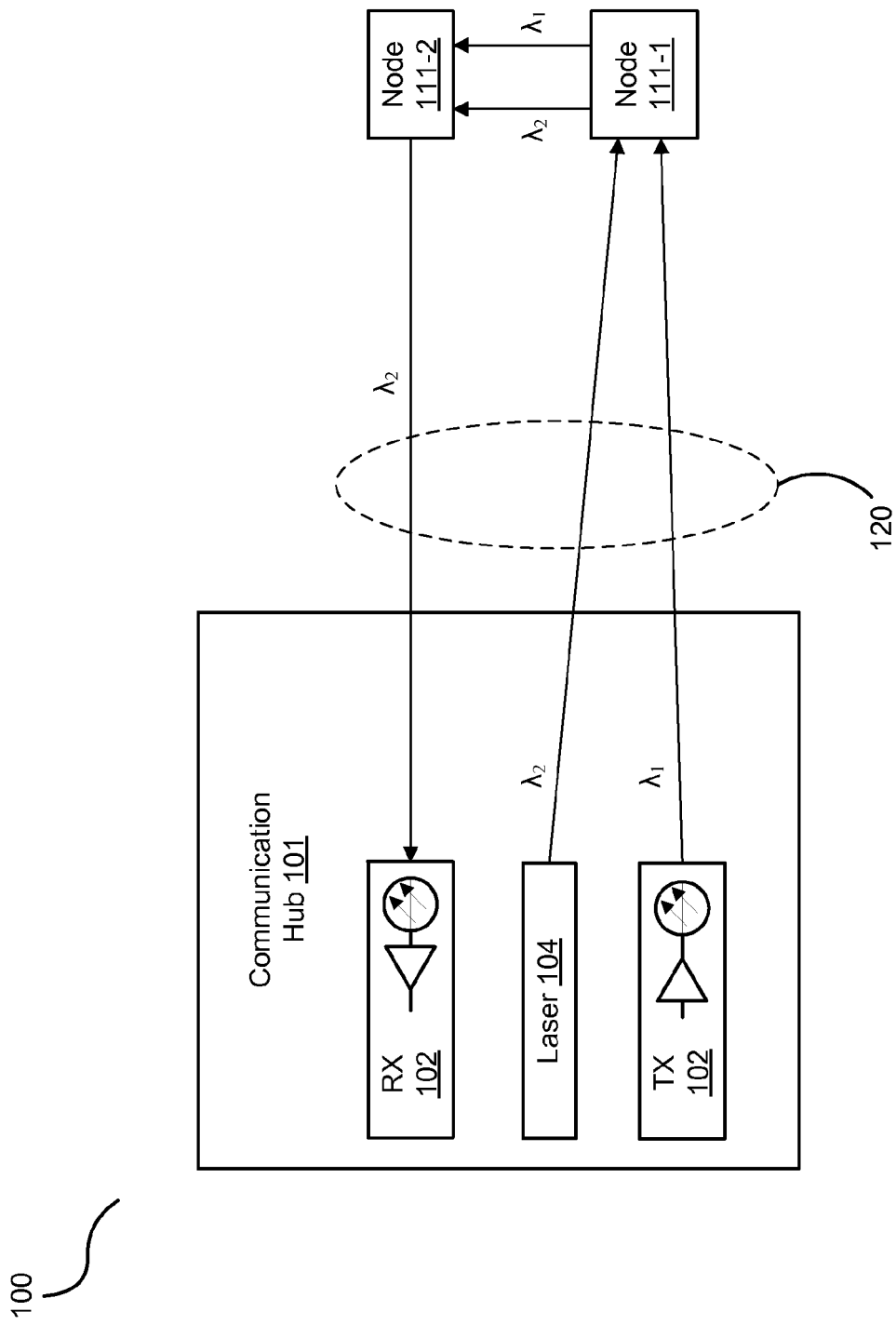
FIG. 1 is a block diagram of an exemplary optical communication system.

FIG. 1 is a block diagram of an exemplary optical communication system 100. The optical communication system 100 includes a communication hub 101 and communications nodes 111-1 and 111-2. The communication hub 101 and the communication nodes 111 are optically coupled to one another via a plurality of optical communication links 120 (e.g., a bundle of optical fibers). Although illustrated with a two communication nodes 111-1 and 111-2, the communication hub 101 is a center point of communication activity and may be coupled to even more communication nodes 111 to transmit data to the communication nodes 111. Thus, the communication hub 101 is any system, device, software, or combination thereof operable to optically communicate data to one or more communication nodes 111.

The communication hub 101 comprises an optical transmitter 102 that optically transmits data to the communication nodes 111-1 and 111-2 over one or more of the optical links 120 at a wavelength $\lambda_1$ of light. The communication nodes 111-1 and 111-2 comprise an optical receiver (not shown) that is optically coupled to the optical transmitter 102 of the communication hub 101 via the optical links 120. The optical receiver receives optical communications from the optical transmitter 102 of the communication hub 101 and converts the data thereof to electronic data. In this regard, the communication node 111 may transfer the electronic data to one or more receivers or data connections (e.g., over radio frequency, RF, via coaxial cable) to facilitate the transfer of data, video, audio, and the like from the communication hub 101 to a plurality of subscribers (e.g., households and businesses).

Each communication node 111 is also operable to optically communicate data to the communication hub 101 over one or more of the optical links 120. Each node 111 is configured with an optical modulator (optical modulator 112 shown below) that is operable to modulate laser light with a modulating source. For example, the optical modulator may be a Mach-Zehnder optical modulator communicatively coupled to a coaxial cable conveying an RF signal which is used to phase modulate laser light in a gain medium of the optical modulator, although other modulating signal sources may be used including digital signal sources. Thus, with respect to the preceding, the communication node 111 is any system, device, software, or combination thereof operable to optically communicate with a communication hub 111.

To improve the optical integrity of the communication system 100, and more specifically the optical transmissions from the communication node 111, the communication hub 101 is configured with a laser 104 that propagates laser light to the optical modulators over one or more of the optical links 120 for return optical communications by the nodes 111 (e.g., "upstream" communications). For example, diode lasers over time can degrade in terms of performance when they are exposed to harsh conditions where communication nodes 111 may be placed. Thus, the communication hub 101 may incorporate the laser 104 within an environmentally controlled climate to maintain consistent performance for the laser 104. The laser 104 propagates unmodulated laser light to the optical modulators of the nodes 111 over the optical communication links 120 such that the communication nodes 111 can modulate the laser light via their respective signal sources and convey the data thereof to an optical receiver 103 of the communication hub 101.

In some embodiments, the optical modulator may include a polarization controller. For example, the optical modulator may exhibit polarization sensitivity due to longer optical links 120 that can be marginalized or otherwise reduced through the use of a polarization controller that modifies the polarization of the light to the optical modulator in a desirable fashion. The polarization controller may also be used for the purposes of polarization division multiplexing. For example, a first communication signal may be conveyed via light in a particular polarization. To increase the capacity, a second communication signal may be conveyed on the same optical link 120 at a polarization that is orthogonal to the first communication signal, potentially doubling the capacity. Additional details regarding the optical modulator and its various components (e.g., transmission line electrodes, a phase shifter, and a transmitter) are shown and described in FIG. 3. An exemplary operation of the optical communication system 100 is now shown and described the process 200 of FIG. 2.

Figure 2:
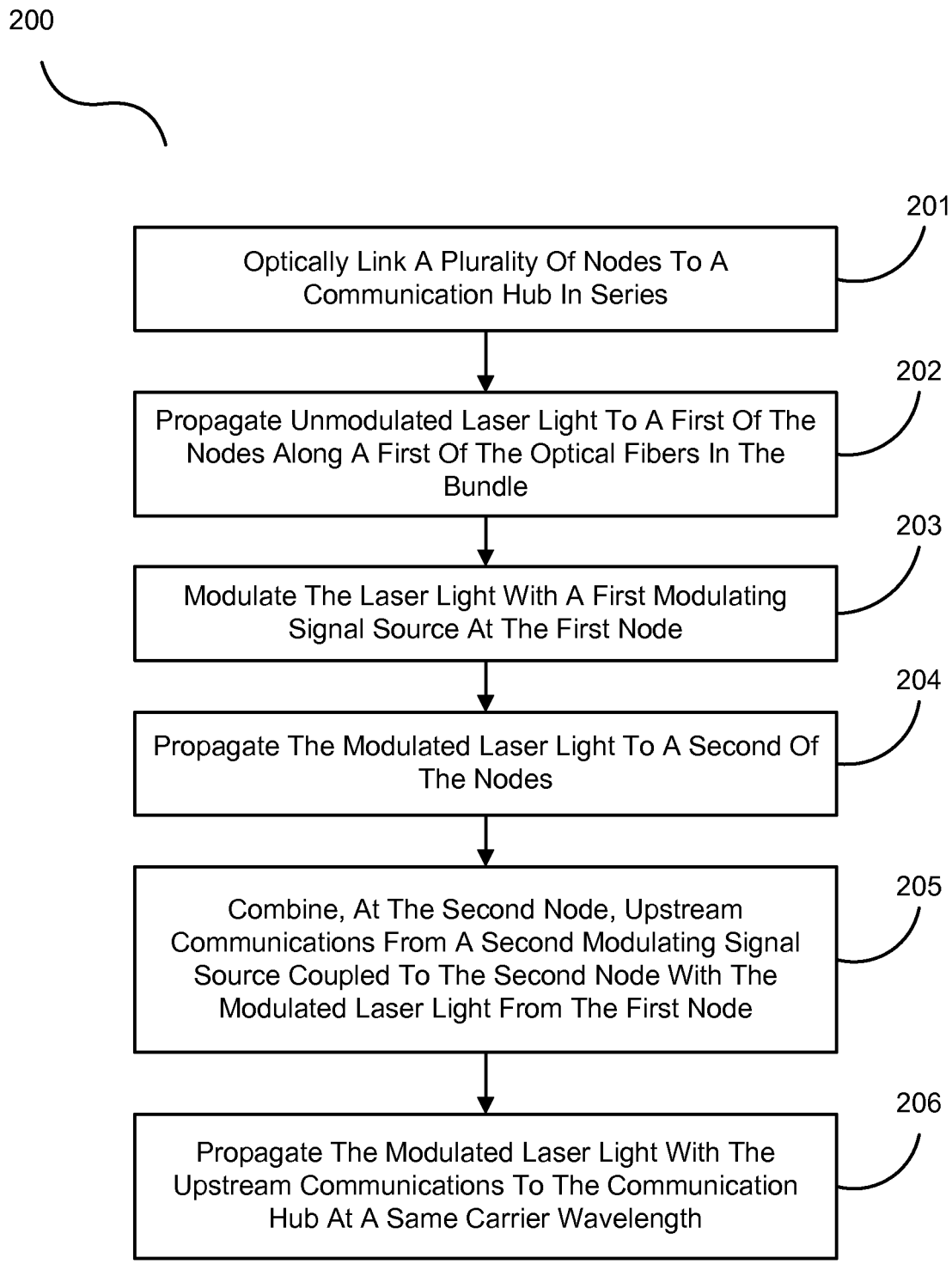
FIG. 2 is a flowchart illustrating an exemplary process of the optical communication system of FIG. 1.

FIG. 2 is a flowchart illustrating one exemplary process 200 of the optical communication system 100. In this embodiment, the process 200 initiates when an optical link 120 is established between the communication hub 101 and the communication nodes 111-1 and 111-2, in the process element 201. Establishment of the optical link 120 generally includes establishing communications between the communication hub 101 and the communication nodes 111-1 and 111-2 over one or more optical fibers run (e.g., buried underground) between the communication hub 101 and the optical modulators of the communication nodes 111-1 and 111-2.

The laser 104 propagates unmodulated laser light to the node 111-1 along a first of the optical fibers at a wavelength $\lambda_2$ of light, in the process element 202. That node modulates the laser light with a first modulating signal source (e.g., an RF signal conveyed over coaxial cable to the node 111-1), in the process element 203. After the light is modulated, the node 111-1 propagates the modulated light to the node 111-2, in the process element 204, such that the node 111-2 can convey the upstream communications of the node 111-1 back to the communication hub 101.

First, however, the node 111-2 combines its upstream communications from another modulating signal source (e.g., another RF signal conveyed over coaxial cable to the node 111-2), in the process element 205, with the modulated laser light from the node 111-1. For example, the unmodulated laser light from the laser 104 may be propagated over one of the fiber optic links 120 to the node 111-1 where it is split and propagated to the node 111-2. The node 111-1 may then modulate that light and propagate it to the node 111-2. The node 111-2 may then convert the modulated light from the node 111-1 to an electrical signal and combine that signal with the signal conveyed to the node 111-2. From there, the node 111-2 may modulate the unmodulated light at the wavelength $\lambda_2$ with the combined signal to propagate both upstream communications from the nodes 111-1 and 111-2 to the communication hub 101 or to another node 111 at the same carrier wavelength, in the process element 206.

The embodiments disclosed herein provide a pathway for higher optical capacities as well as the ability to optimize communications over existing optical links. For example, a traditional cable television node is used to translate amplitude modulated light from a communication hub to an RF signal covering less than 1 GHz of bandwidth. The RF signal is then propagated to households and businesses. The modulation imprinted on an optical carrier can comprise 160 multiplexed digital quadrature amplitude modulation (QAM) or analog National Television System Committee (NTSC) subcarriers. The node has an optical receiver operable to receive signals between about 50 MHz to 1002 MHz. The node also has a laser transmitter intended for upstream return information of about 100 MHz. Increasing demand for data over the limited upstream spectrum has led to the exploration of other upstream ranges of 5 MHz to 85 MHz and 5 MHz to 204 MHz, which generally results in a change to downstream frequency ranges.

NTSC analog signals and other signals can exhibit high linearity and dynamic range. Laser requirements with such parameters are generally very stringent. And, higher signal-to-noise ratios (SNRs) are typically required to support higher order modulations. For example, next generation Data Over Cable Service Interface Specification (DOCSIS) systems, such as DOCSIS 3.1, have been designed to support 4,096 state QAM and 16,384 state QAM. And, the SNR for these modulations generally needs to be significantly higher. It should be noted, however, that NTSC is a United States standard and that the embodiments disclosed herein may also be useful/advantageous with other signaling standards such as those used in the European cable television industry.

Demands on upstream communications from communication nodes (e.g., from cable television data subscribers), such as the communication node 111, are also pushing cable television operators to use higher quality diode lasers. As upstream communications may encounter many types of interference, SNR is even more important when employing QAM.

One way to increase capacity and alleviate the need for higher SNR and more exotic modulations could be to simply increase the number of optical links between the communication hub of the cable television network (e.g., the communication hub 101) and the communication node. However, when optical fibers were initially laid to establish the optical links, they were done so in a "loop" configuration in which the communication hub is connected to a plurality of communication nodes cascaded in series with the last communication node in the link connecting back to the communication hub. And, there were only a few fibers dedicated to each node because communication nodes were originally designed to cover 500 to 1000 homes with a fiber bundle connecting these nodes via six to twelve fiber strands. So, increasing the number of optical links to accommodate ever-increasing capacity would mean laying down and burying new bundles of optical fiber, a costly and labor-intensive effort.

Moreover, a node is typically configured in a harsher operating environment than the communication hub. For example, the communication hub typically has sophisticated equipment that needs to be maintained and housed in a stable operating environment. The nodes, however, are typically located in boxes outdoors and have limited space (e.g., due to real estate covenants, property owner rights, etc.). These harsher operating environments eventually degrade performance of diode lasers and generally preclude the use of more sophisticated lasers when higher capacity is being sought after. By moving the laser 104 to the more climate controlled environment of the communication hub 101, laser performance can be extended and even improved. Of course, this is just one example of how the system 100 may be implemented. Other exemplary embodiments are shown and described below.

Figure 3:
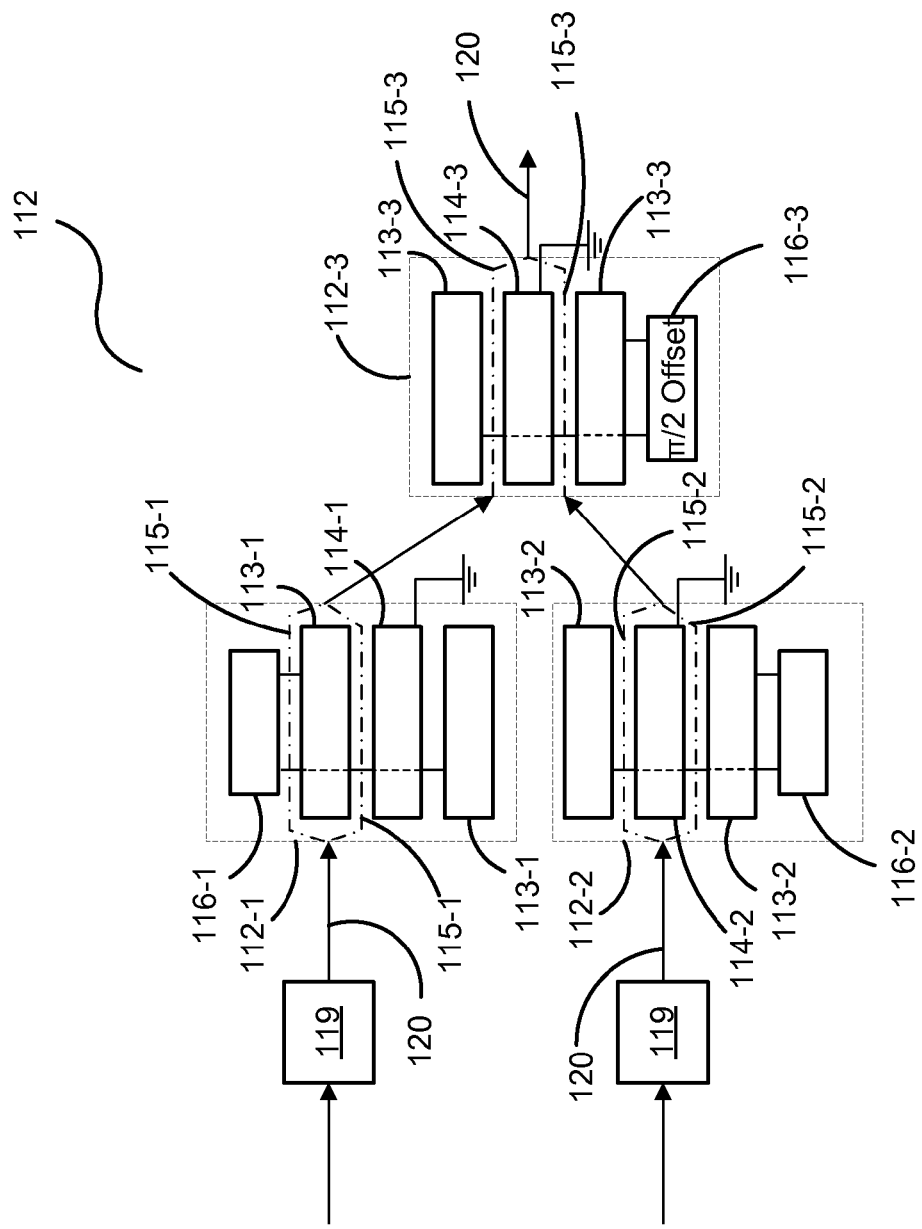
FIG. 3 is a block diagram of an exemplary QAM optical modulator.

FIG. 3 is a block diagram of an exemplary QAM optical modulator 112. In this embodiment, the QAM optical modulator 112 comprises a plurality of "sub-optical modulators" 112-1, 112-2, and 112-3. Each optical modulator 112, in this embodiment, is configured in a Mach Zehnder architecture. In this regard, each optical modulator 112 includes two coupled phase shifters 114 (e.g., an electrode, a crystal medium, a gain medium, or any combination thereof), a pair of optical waveguides to carry the optical signal in the phase shifters 114, a pair of transmission line electrodes 113 to modify the effective length of the optical path through electrical stimulation within the coupled phase shifters 114, and a transmitter 116 operable to convey the signal from the source 122 to the electrodes 113.

Each optical modulator 112 splits the unmodulated light into its corresponding pair of waveguides 115 around its corresponding coupled phase shifters 114. As such, the optical waveguides 115 split the unmodulated light into two phase shifted branches and recombine after modulation by the transmitter 116 to form, after the interaction of the two phase shifted branches, an amplitude and phase modulated signal. Along the portion where the optical waveguide 115 splits in two, the electrodes 113 may be configured as transmission lines to achieve relatively high modulation frequencies (e.g., a 100 GHz frequency response).

With this in mind, the optical modulator 112-1 receives unmodulated laser light from the laser 104 along the optical link 120 and modulates the light with a signal from a source 122 via the coupled phase shifters 114-1. The optical modulator 112-2 also receives the unmodulated laser light from the laser 104 (i.e., at the same wavelength) and modulates that light with a signal from the same or another source 122 via the coupled phase shifters 114-2. The two phase shift modulated signals from the optical modulators 112-1 and 112-2 are then propagated to the optical modulator 112-3 to combine as a QAM signal via the coupled phase shifters 114-3 and the transmitter 116-3. For example, the transmitter 116-3 may provide a π/2 phase offset that offsets the two signals from the optical modulators 112-1 and 112-2 by 90° from one another to form the Quadrature Phase Shift Keyed (QPSK) signal when the modulators 112-1 and 112-2 generate a 2-level optical signal. By amplitude modulating the input signals to the optical modulators 112-1 and 112-2 beyond 2 levels via the transmitters 116-1 and 116-2, respectively, the QPSK signal becomes a higher state QAM signal (e.g., 16 state QAM, 64 state QAM) after the 90 degree phase-shift applied by the optical modulator 112-3.

The optical waveguide pairs 115, in this embodiment, are illustrated between the electrodes 113. However, depending on the crystal characteristics of the coupled phase shifters 114, the transmission line electrodes 113 may be configured above the waveguide pairs 115 within the coupled phase shifters 114. The coupled phase shifters 114 center electrode 113 is grounded and the top and bottom electrodes 113 typically have equal but opposite sign voltages to achieve equal but opposite sign phase shifts with respect to the same drive voltage.

Generally, Mach Zehnder optical modulator architectures can be manufactured from materials exhibiting certain electro-optic effects that change the index of refraction based on the voltage applied. As the index of refraction changes, the effective dimension of the optical path changes and a phase shift occurs. Lithium niobate, indium phosphide, and various polymers are some of the materials that may be used to implement the coupled phase shifters 114. In some embodiments, the phase shifter 114 may be configured with a material that provides an optical gain (e.g., an optical gain medium) to the modulated signal.

Mach Zehnder architectures can be fairly sensitive to polarization changes. Accordingly, the communication system 100 and/or any of the optical modulators 112 involved may be configured with a polarization controller 119 as described above to compensate for a shift in polarization rotation.

The transmitter 116 may be configured in a variety of ways depending on the input signal being used to modulate the unmodulated light from the laser 104. For example, assuming that the signal from the source 122 is an analog signal (e.g., an RF signal), the transmitter 116 may include an analog to digital converter that converts the analog signal to a digital signal which is thereby used to modulate the unmodulated light via the bipolar stimulation of the electrodes 113. In another implementation, the digital signal generates a multi-level stimulation that is used to generate an optical QAM signal. In yet another implementation, the transmitter takes the RF source and amplifies it to an optimum level to drive the optical modulator 112 using certain functionality, such as automatic gain control.

Additionally, the signal driving the optical modulator 112 can be conditioned so that it is optimized for high frequency operation. For example, a mismatch can exist between the propagation speed of an electrical signal on electrical transmission lines which connect to the electrodes 113 and the propagation speed through the optical waveguides. The optical signals on the optical waveguide modulated by the electrical signal where the phase shift and/or optical gain of the coupled phase shifters 114 take place can experience distortion. Thus, the electrical signals driving the optical modulator 112 can be conditioned to achieve more linearity (e.g., via pre-distortion conditioning techniques).

Figure 12:
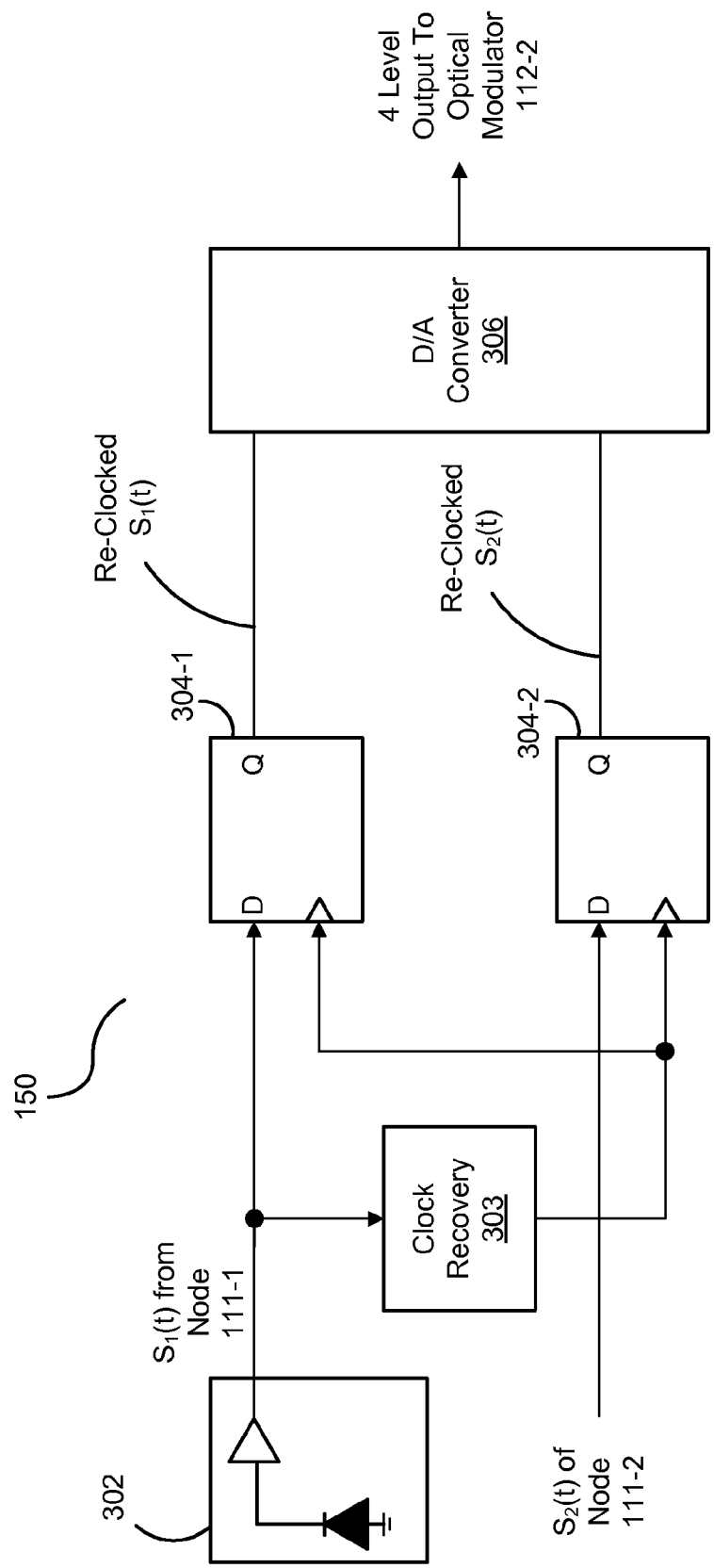
FIG. 12 is a block diagram of a synchronization module used in a communication node.

As mentioned, the signal driving the optical modulator 112 may be a digital signal that actually improves optical performance. For example, RF signal digitization along increased digital capacity lines can be used to increase transmission performance compared to an analog optical link. To accomplish such, the transmitter 116 may be configured with an analog to digital converter that samples the entire RF signal. In any case, the signal driving circuitry may include delay functionality to allow for other features such as time division multiplexing. A clock input to synchronize re-modulation may be used for implementing other multiplexing techniques. An example of such is illustrated in FIG. 12.

Figure 4:
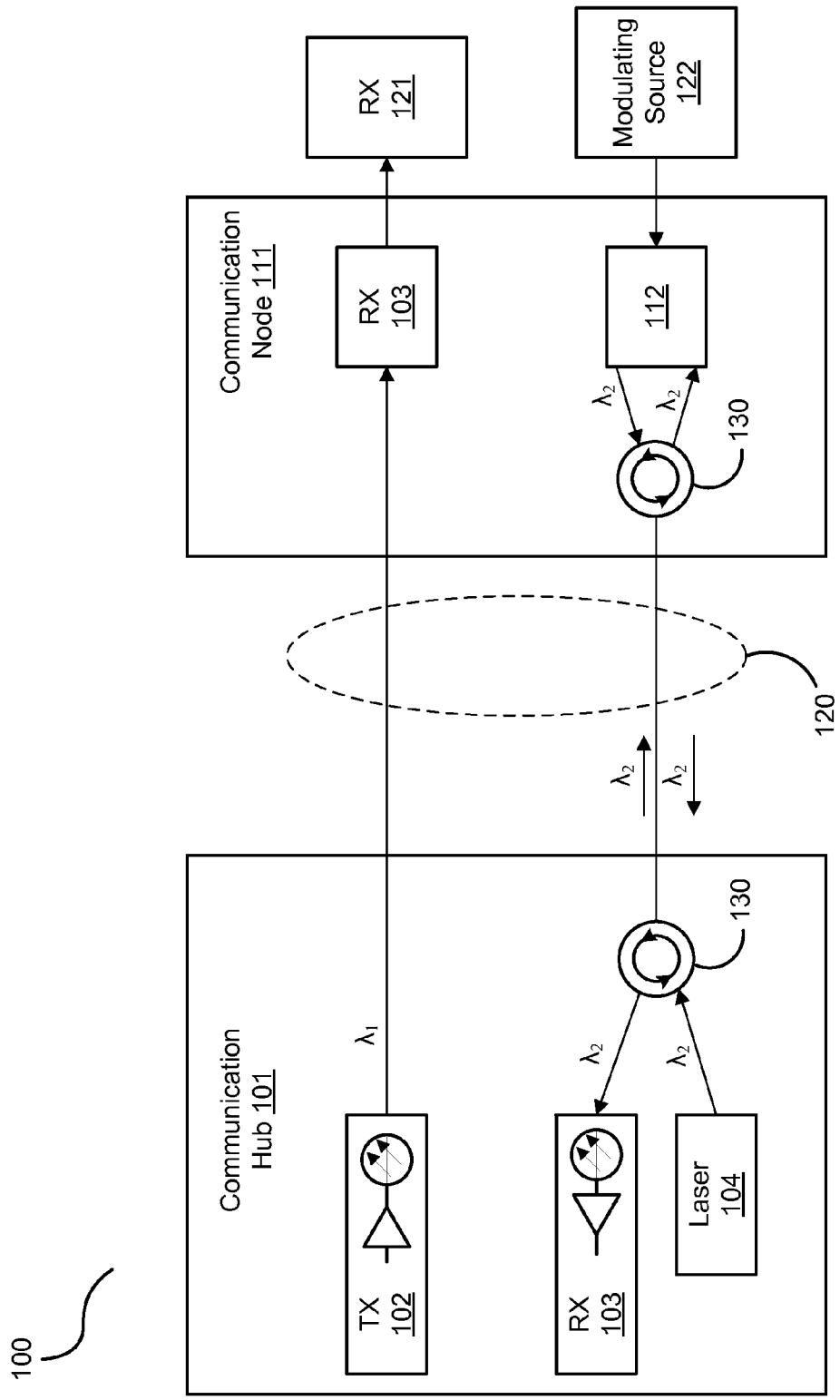
FIGS. 4-11 are block diagrams of other exemplary optical communication systems.
Figure 5:
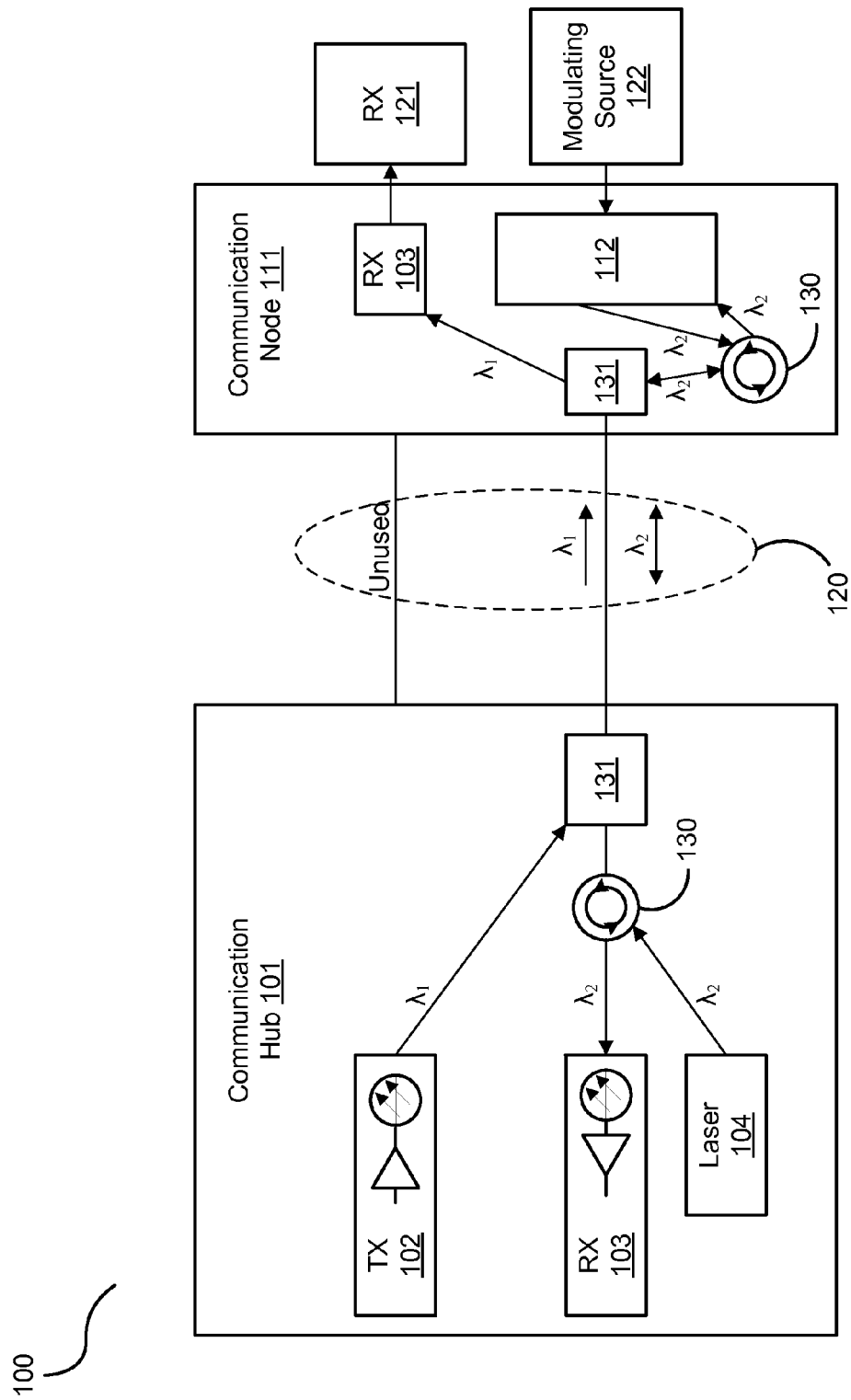

FIGS. 4-11 are block diagrams of other exemplary optical communication systems. Each of these embodiments may be used to optimize optical communications and increase capacity, more particularly in the upstream optical communications. In FIG. 4, a communication hub 101 is operable to optically transmit data from an optical transmitter 102 to an optical receiver 103 of a communication node 111. In this embodiment, the optical data transmitted to the communication node 111 is propagated along an optical link 120 at a wavelength $\lambda_1$. The optical receiver 103 of the communication node 111 may then convert the received signal to an analog RF signal conveyed over coaxial cable to a receiver 121.

The communication hub 101 is also configured with an optical receiver 103 that is similarly used to convert a received signal from an external modulator 112 of the communication node 111. As with the previous embodiments, the laser 104 is configured with the communication hub 101 to transmit unmodulated light along an optical link 120. In this embodiment, the laser 104 propagates light at a wavelength $\lambda_2$ to the external modulator 112 in the communication node 111. The communication node 111 then modulates the light $\lambda_2$ at the external modulator 112 in the communication node 111 using the signal from the modulating source 122 (e.g., an RF signal propagated along a coaxial cable).

To assist in reducing the number of optical links 120 used in transmitting data from the communication node 111 to the communication hub 101, the communication hub 101 also employs an optical circulator 130. The optical circulator is used to separate optical signals traveling along an optical link 120 in opposite directions. For example, the optical circulator 130 may be a three-port device such that light entering any port exits from the next so as to achieve bi-directional propagation over a single optical link 120. Thus, the laser 104 can propagate the modulated light at the wavelength $\lambda_2$ to the external modulator 112 of the communication node 111 for modulation via the modulating source 122 and have the modulated light at the wavelength $\lambda_2$ propagated along the same optical link 120 to the receiver 103 of the communication hub 101, thereby reducing the need for an additional optical link 120 as illustrated in the embodiment of FIG. 1.

The embodiment in FIG. 4 is exemplarily illustrated with the transmitter 102 of the communication hub 101 transmitting light at the light at the wavelength $\lambda_1$ and the laser 104 transmitting light at the wavelength $\lambda_2$. One reason for this leads to the embodiment illustrated in FIG. 5 which allows for yet another optical link 120 to be removed and preserved for other uses such as higher capacity. For example, in FIG. 5, the communication hub 101 optically transmits optical data from the transmitter 102 at a wavelength $\lambda_1$. The laser 104 in the communication hub 101 propagates unmodulated light at a wavelength $\lambda_2$ to the optical circulator 130 into the communication node 111. The outbound unmodulated light from the laser 104 is then combined with the optical data at the wavelength $\lambda_1$ from the external modulator 112 with the optical element 131 (e.g., a diffraction grating or an optical splitter) past the optical circulator 130 to propagate both wavelengths of light along the same optical link 120.

The combined light of wavelengths $\lambda_1$ and $\lambda_2$ arrives at the communication node 111 and are separated by another optical element 131 (e.g., a splitter or diffraction grating). The optical data of the wavelength $\lambda_1$ from the optical transmitter 102 of the communication hub 101 then propagates to the receiver 103 of the communication node 111. And, the unmodulated light of the wavelength $\lambda_2$ propagates to the optical circulator 130 of the communication node 111 where it is modulated by the external modulator 112 with the signal of the modulating source 122. The modulated light from the external modulator 112 then propagates to the optical circulator 130 so that it can propagate along the same optical link 120 as the unmodulated light (i.e., in the opposite direction). The modulated light is then split by the optical element 131 such that it may be received by the receiver 103 of the communication hub 101 (e.g., after passing through the optical circulator 130). As can be seen, the different wavelengths being combined on the same optical link 120 allows for another optical link to be freed for other use (e.g., higher capacity).

Figure 6:
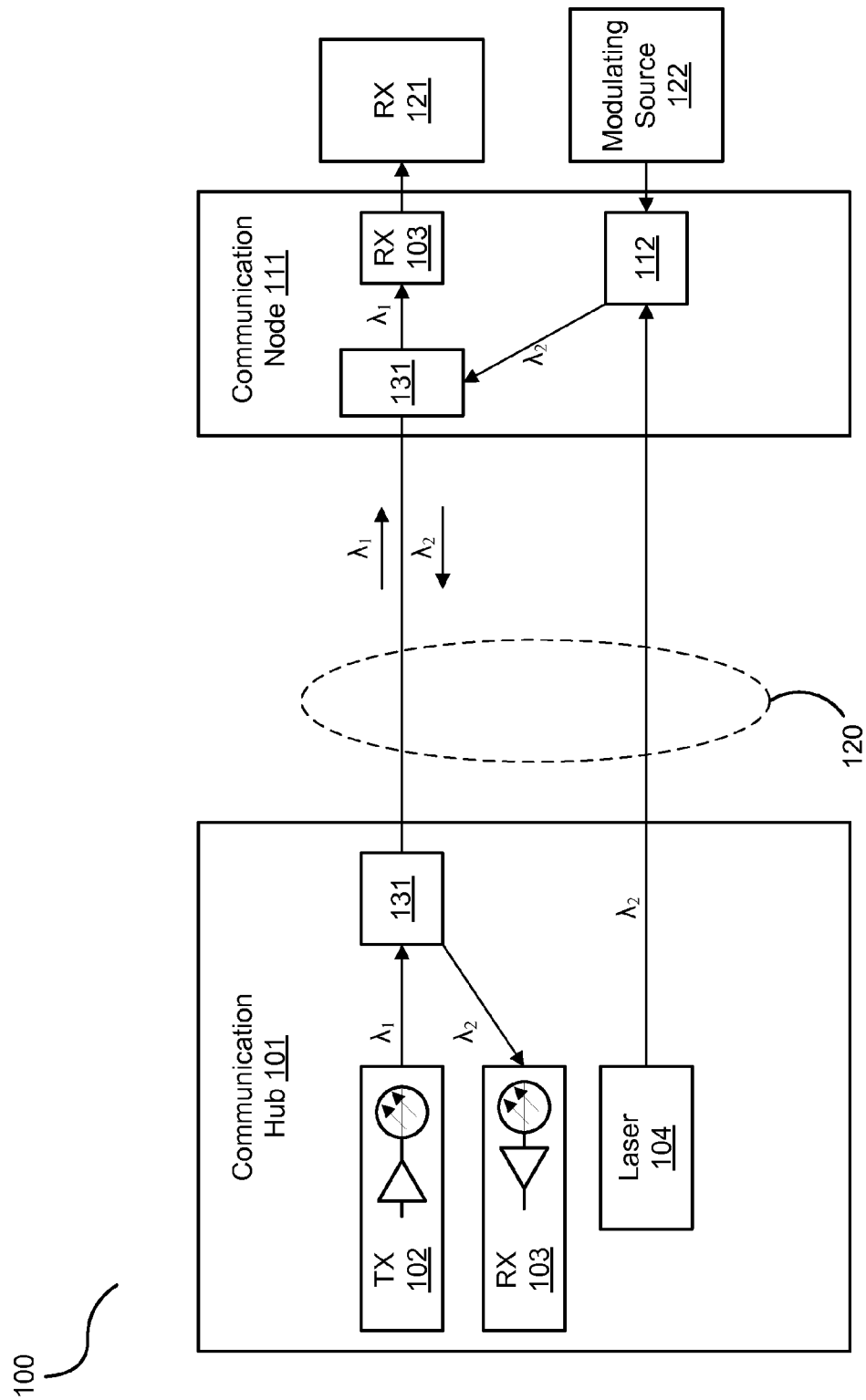

In FIG. 6, the communication system 100 propagates the modulated light from the laser 104 at the wavelength $\lambda_2$ directly to the external modulator 112 of the communication node 111 for modulation. Thereafter, the modulated light from the external modulator 112 of the communication node 111 is combined with the incoming light at the wavelength $\lambda_1$ from the transmitter 102 of the communication hub 101 at the optical element 131 of the communication node 111 (e.g., again, an optical splitter or a diffraction grating). The modulated light at the wavelength $\lambda_2$ is then propagated along the same optical link 120 as the incoming light at the wavelength $\lambda_1$ and is split off from the optical link 120 with the optical element 131 in the communication hub 101 where it is received by the receiver 103.

Figure 7:
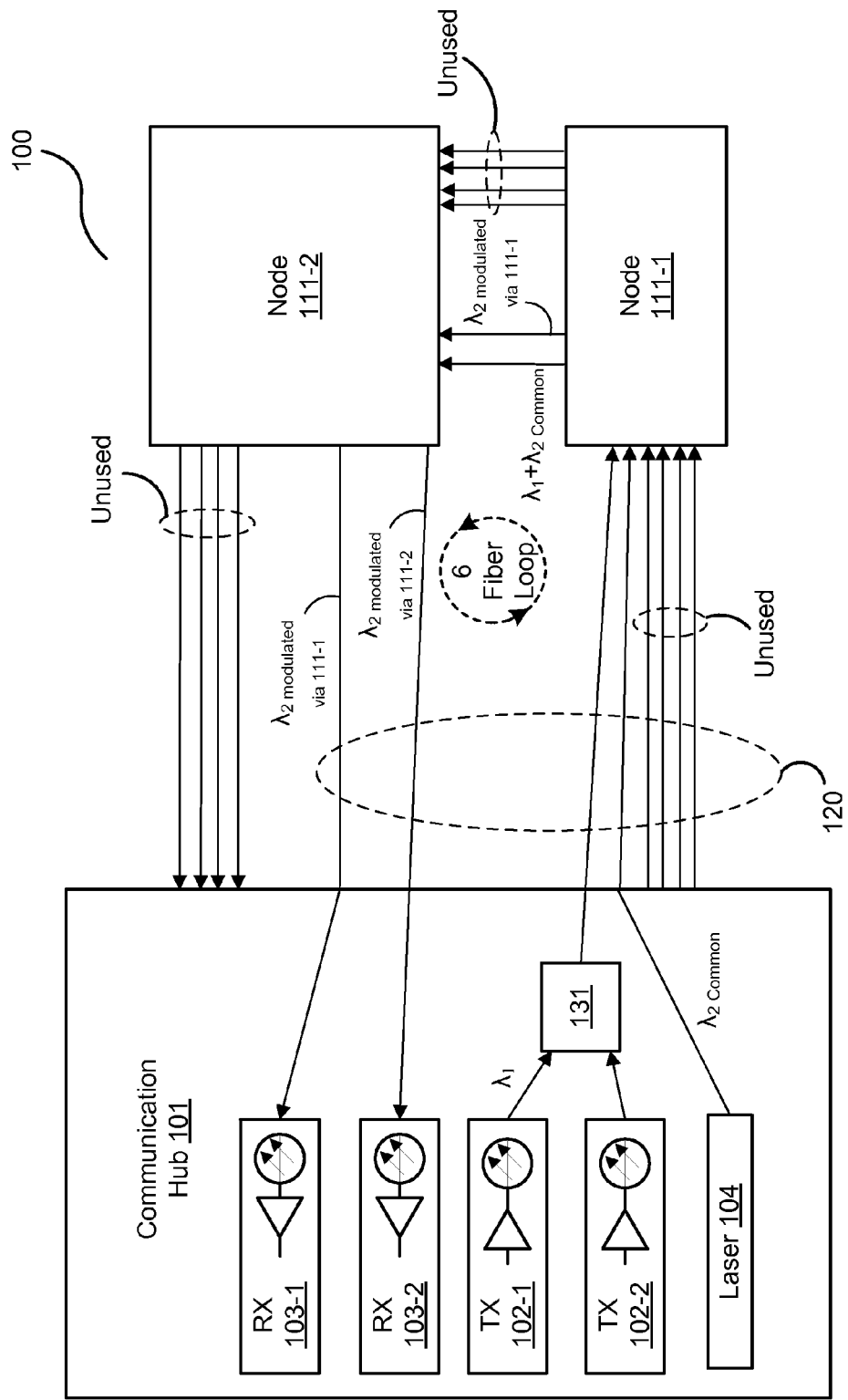

FIG. 7 illustrates the communication system 100 with a plurality of cascaded nodes 111-1 and 111-2. In this embodiment, the communication hub 101 has a receiver 103 for each of the communication nodes 111. The receiver 103-1 receives upstream communications from the node 111-1 and the receiver 103-2 receives upstream communications from the node 111-2. The communication hub 101 again comprises a transmitter 102-1 that transmits optical communications at a wavelength $\lambda_1$ to the node 111-1 and a transmitter 102-2 that transmits optical communications at a wavelength $\lambda_2$ to the node 111-2. The communication hub 101 also comprises a laser 104 operable to propagate light at a common unmodulated wavelength $\lambda_2$ to each of the nodes 111-1 and 111-2.

As can be seen in this embodiment, the communication hub 101 is optically coupled to the node 111-1 with six optical links 120. This embodiment is intended to illustrate how an optical network can be configured with a bundle of optical fibers. For example, in a cable television network, the communication hub 101 is connected to a plurality of nodes via a plurality of optical links 120. Generally, this is implemented with a plurality of optical fibers being laid underground or above ground in a "loop" configuration, with the optical fibers usually being configured in bundles of multiple of six optical fibers. And, each node 111 has its own dedicated optical fiber for upstream communications to the communication hub 101. Thus, if there are 5 nodes 111 in a loop, then all optical fibers in a bundle of six optical fibers are used because one of the optical fibers is common to each node 111 for downstream communications that uses separate wavelengths and can be aggregated into a single optical fiber coming from the communication hub 101.

Once laid, the bundle of optical fibers is intended to be a somewhat permanent fixture. Thus, when additional homes connect to a particular node 111 and/or when additional capacity is required of a node 111, communications over the fixed number of optical fibers is at a premium.

This embodiment and others below alleviate some of the problems associated with fixed bundles of optical fibers. In this embodiment, the node 111-1 is optically coupled to the communication hub 101 via six optical links 120, four of which are shown as being unused because only two nodes 111 are illustrated. The communication hub 101 transmits communications to each of the nodes 111-1 and 111-2 along a common optical link 120 respectively at the wavelengths $\lambda_1$ and $\lambda_2$. The communication hub 101 propagates unmodulated light at the wavelength $\lambda_2$ along another common optical link 120. The node 111-1 modulates the light at the wavelength $\lambda_2$ via its modulating source 122 (not shown) and propagates the modulated light to the node 111-2 along yet another of the optical links 120. The node 111-1 also propagates the unmodulated light at the wavelength $\lambda_2$ to the node 111-2 along an unused fiber so that it can modulate it via its modulating source 122 (not shown) and propagate its upstream communications to the communication hub 101.

The node 111-2, being the last node in the loop before the communication hub 101, can simply modulate the light at the wavelength $\lambda_2$ and propagate it along the same optical link used to carry the unmodulated light at the wavelength $\lambda_2$ to the node 111-2. Thus, four optical links 120 remain unused from the node 111-2 to the communication hub 101, meaning there are 4 additional optical links 120 that could be used for additional capacity.

It should be understood that, while the communication system 100 and this embodiment is illustrated with two nodes 111-1 and 111-2, the invention is not intended be limited to the illustrated embodiment. The communication system 100 can be and typically is configured with more nodes 111 than illustrated in this embodiment.

Figure 8:
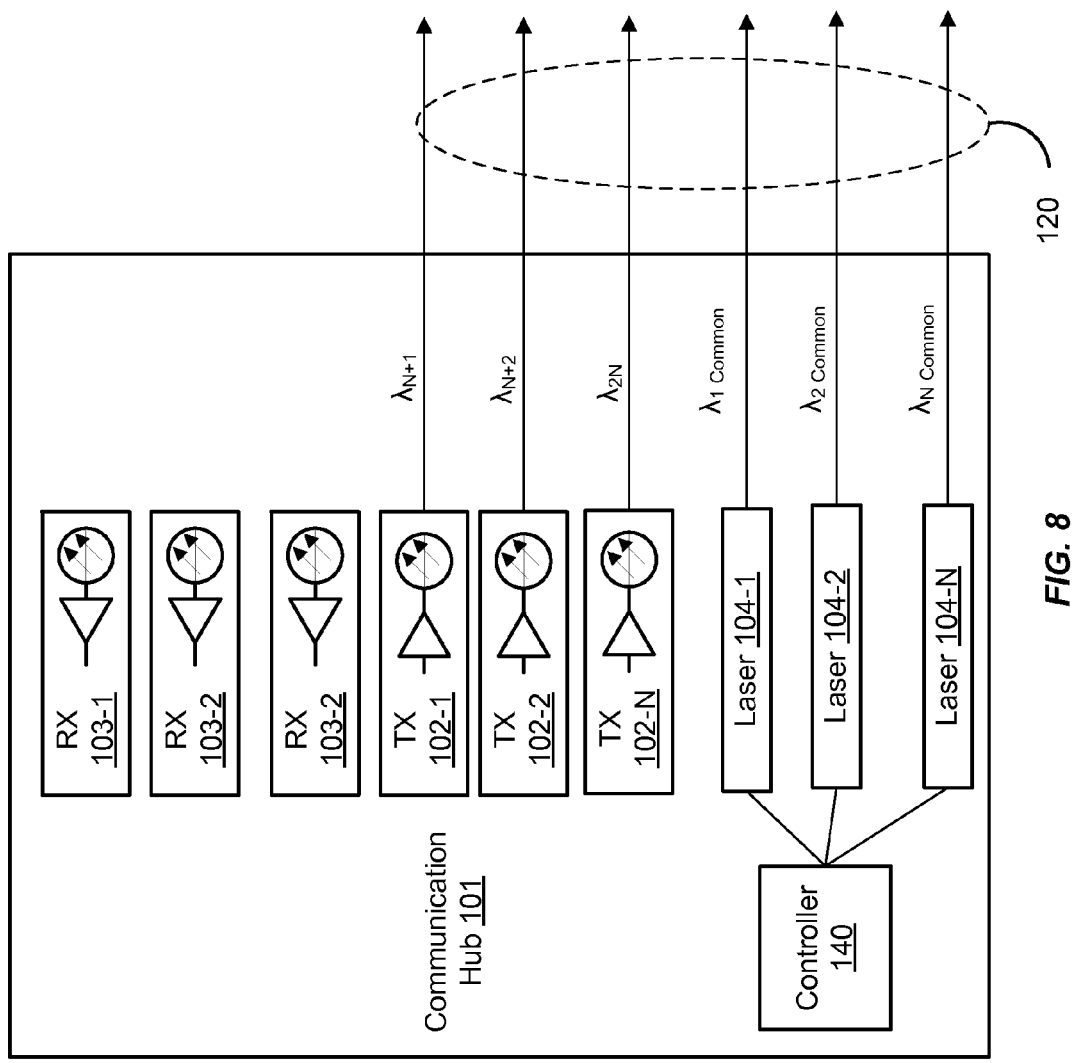

FIG. 8 illustrates an embodiment in which the communication hub 101 comprises a plurality of lasers 104-1-104-N (where the reference "N" is merely intended to represent an integer greater than one and not necessarily equal to any other "N" reference used herein), each operating at a particular wavelength $\lambda$ (i.e., $\lambda_{N+1}$-$\lambda_{2N}$). The lasers 104-1-104-N are, like in previous embodiments, operable to propagate unmodulated light to a communication node 111 such that the communication node 111 can modulate the light and propagate it back to the communication hub 101. The communication hub 101 may selectively couple one or more of the lasers 104-1-104-N to the communication node 111 over the plurality of optical links 120.

The communication hub 101, in this embodiment, includes a temperature/climate controlled environment that allows the lasers 104-1-104-N to operate with stable output characteristics. This implementation combines configuration flexibility with certain performance improvements. For example, the lasers 104-1-104-N, being external cavity lasers, may be selected based on the size of the external cavity. In other words, the wavelength necessary to maintain coherent communications with the desired separation in frequency or wavelength may depend on the cavity length. Accordingly, the controller 140 may select a particular laser wavelength for any given node. And, since they are separate wavelengths, the light from lasers 104-1-104-N can be propagated along a common optical link 120.

Figure 9:
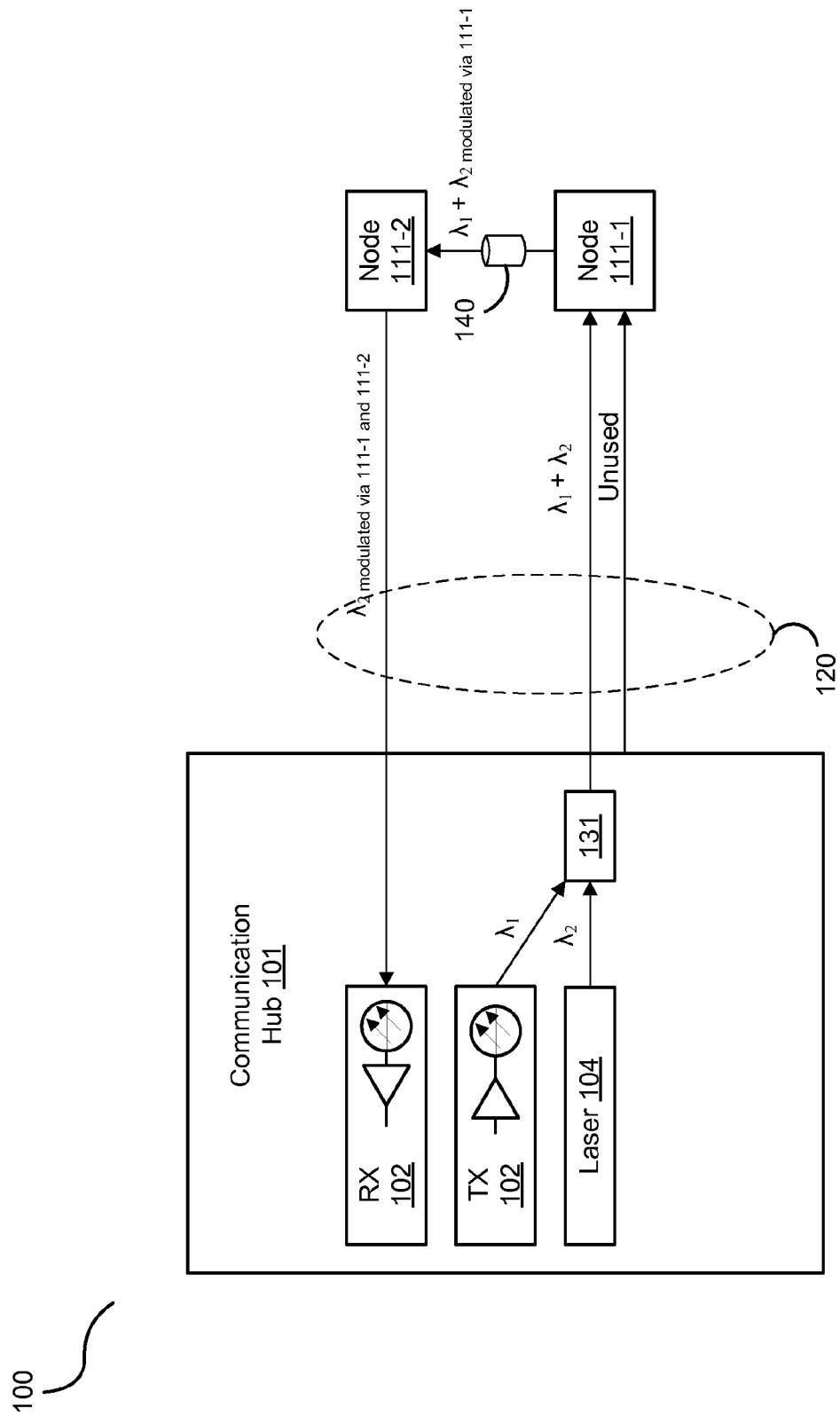

Turning now to FIG. 9, the communication system 100 in this embodiment provides wavelength multiplexing over the optical links 120 to a plurality of cascaded nodes 111 (e.g., nodes 111-1 and 111-2). In this embodiment, the communication hub 101 transmits downstream data at a wavelength $\lambda_1$ and the laser 104 propagates unmodulated light at a wavelength $\lambda_2$. The two wavelengths of light are combined (i.e., multiplexed) at the optical element 131 and propagated to the node 111-1 over a single optical link 120.

The other optical link 120 between the communication hub 101 and the node 111-1 is again illustrated in this embodiment as being unused for the purposes of showing how installed fiber optic links can be optimized for capacity. As mentioned, the number of optical links 120 may be at a premium. This is particularly true with the trend of "shrinking" node sizes due to capacity increases. For example, in a cable television network, a node 111 may communicatively couple to a plurality of households and businesses via RF over a coaxial cable. As communication capacity demands increase for each of the household and businesses, the node 111 may have less ability to serve those capacity demands. Accordingly, the node 111 shrinks to serve fewer households and businesses and another node 111 is established for those households and businesses removed or otherwise "squeezed out" of the previous node 111.

Wavelength division multiplexing has been used and will likely continue to be used to alleviate problems associated with fewer optical links due to shrinking node sizes. But, when data rates increase (e.g., 40 Gigabits per second, or Gbps), wavelengths come at a premium. For example, multiple wavelengths $\lambda$ of light can be propagated along the single optical link 120. When each wavelength $\lambda$ of light is used to transmit more capacity, the spectrum used by the transmitter of the wavelengths $\lambda$ of light are widened. Eventually, the optical link simply runs out of spectrum to transmit, thus requiring more of the fixed number of optical links 120. In other words, more capacity eventually translates into a higher number of optical links needed which may be impractical when the optical links are already established and buried underground.

There are different ways of multiplexing signals of different nodes 111. For example, multiplexing can be performed solely in the digital optical domain through coordinated optical re-modulation in a subsequent node 111. Alternatively, multiplexing may be performed in the electrical domain by detecting, multiplexing data streams, and then modulating the aggregate data stream.

In the digital optical domain, basic modulation of light takes place by changing characteristics of the light (e.g., such as frequency, phase, intensity, etc.). For example, by changing the intensity of a laser between two states, one can provide an amplitude modulated digital signal. By employing more exotic and complex modulation schemes such as QAM, each symbol in the modulation scheme represents multiple bits and therefore can be used to increase capacity in terms of the overall data rate, but at the expense of greater complexity.

In this embodiment, the unmodulated light at the wavelength $\lambda_2$ from the laser 104 is split off by the node 111-1 from the communications of the transmitter 102 in the communication hub 101 (i.e., the wavelength $\lambda_2$ of light). The node 111-1 then modulates the light at the wavelength $\lambda_2$ via its respective modulating source 122 (not shown) and propagates both the downstream communications and the modulated light at the wavelength $\lambda_2$ along the same optical link to the node 111-2. The node 111-2 then splits off the downstream communications from the communication hub 101 and "re-modulates" the light at the wavelength $\lambda_2$ modulated by the node 111-1 using its respective modulating source 122 (not shown). The node 111-2 then propagates the light at the wavelength $\lambda_2$ modulated by both nodes 111-1 and 111-2 and conveys their respective upstream communications to the receiver 102 of the communication hub 101 over the same optical link 120 and carrier wavelength $\lambda_2$.

Such may be implemented using QAM modulation. An optical delay 140 prior to the modulator 112 of the node 111-2 may be used to provide the node 111-1 with sufficient timing for synchronization purposes. Through the use of coherent optical links 120, this multiplexing scheme can be expanded to more nodes. Thus, the modulation technique may increase with the number of nodes. For example, four nodes 111-1-111-4 each applying a bi-level (2-level) modulation through proper modulation mechanisms may result in a combined 16 state QAM signal being propagated from the node 111-4 to the communication hub 101. Further modulation techniques are shown and described in FIGS. 10 and 11.

Figure 10:
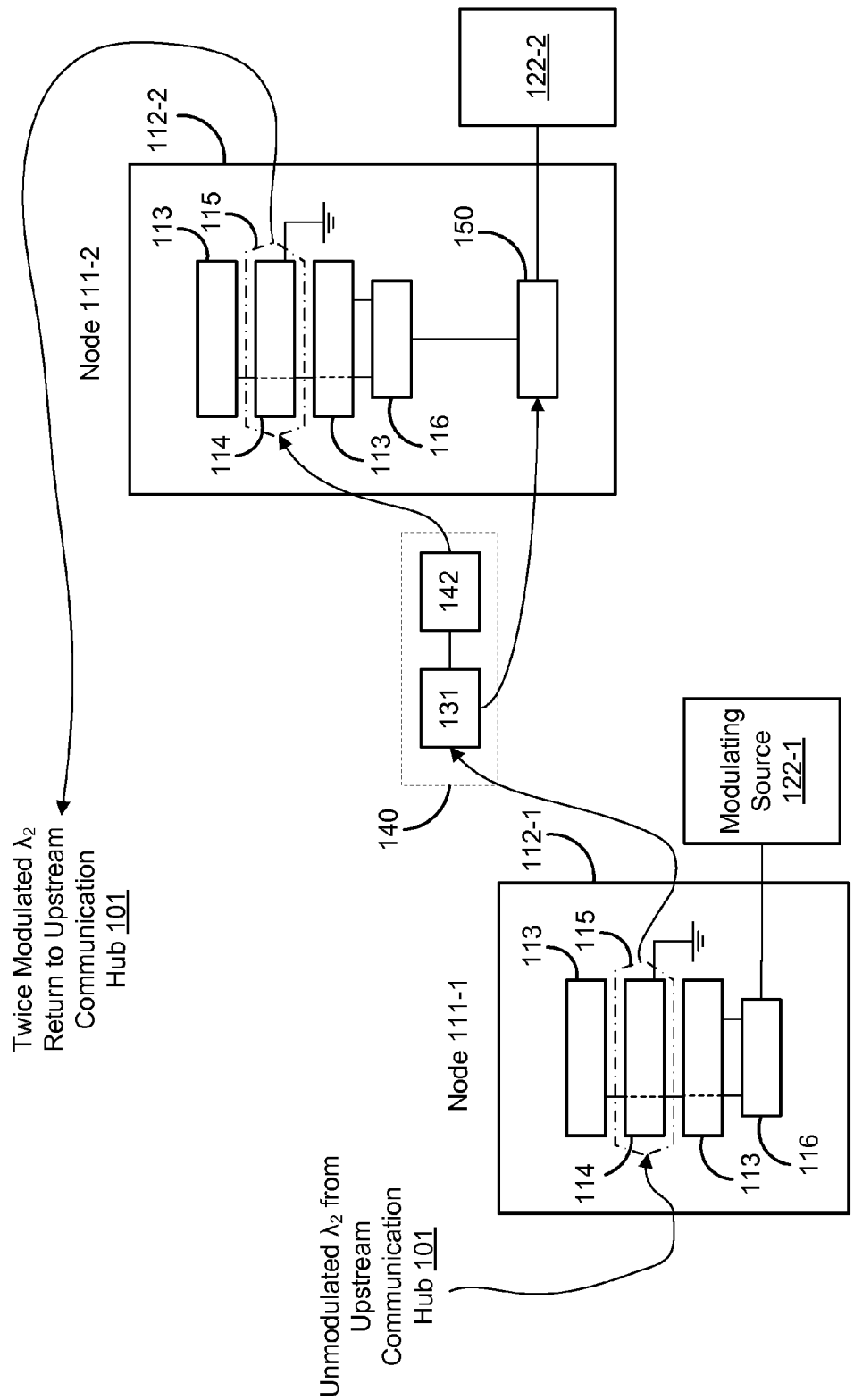

FIG. 10 is a block diagram of the modulators 112-1 and 112-2 of the nodes 111-1 and 111-2, respectively. The downstream communications from the communication hub 101 are not shown in this embodiment for the sake of simplicity. Rather, this embodiment only illustrates the modulators 112 so as to show one exemplary implementation of the unmodulated wavelength of light $\lambda_2$ that gets modulated by the two nodes 111-1 and 111-2. Again, it should be noted that the invention is not intended to be limited to any particular number of nodes or their particular configurations as the embodiments herein may be combined in various ways as a matter of design choice.

In this embodiment, the modulator 112-1 of the node 111-1, being the first node in the cascaded optical loop, receives unmodulated light at the wavelength $\lambda_2$ at the gain medium 114 of the modulator 112-1. The modulator 112-1 modulates that light with its respective modulating source 122-1 (e.g., an RF signal conveyed over coaxial cable) via its transmitter 116. That modulated light at the wavelength $\lambda_2$ is then propagated to the optical delay 140 to synchronize the light for modulation by the modulator 112-2 of the node 111-2. The optical delay 140 may be configured with the optical element 131 (e.g., a splitter or a diffraction grating) and an optical delay element 142 (e.g., an optical cavity of mirrors such as that found in a Herriott delay line). The optical element 131 splits off a portion of the modulated light at the wavelength $\lambda_2$ which is propagated to a synchronization module 150. The remaining portion of the modulated light at the wavelength $\lambda_2$ is propagated to the gain medium 114 of the modulator 112-2.

The synchronization module 150, detects the split-off optical signal ahead of time from the same optical signal arriving directly at the modulator. The synchronization module 150 uses that detected signal from the modulator 112-1 to synchronize and condition the modulation signal from modulating source 122-2. The newly synchronized conditioned electrical modulation signal is then transferred to the transmitter 116 of the modulator 112-2 such that the upstream communications of the node 111-2 can be modulated onto that light at the precise time and at the right amplitude, thereby re-modulating light from the modulator 112-1. From there, the twice modulated light is propagated at the carrier wavelength $\lambda_2$ to convey the upstream communications from the both of nodes 111-1 and 111-2 to the communication hub 101.

Figure 11:
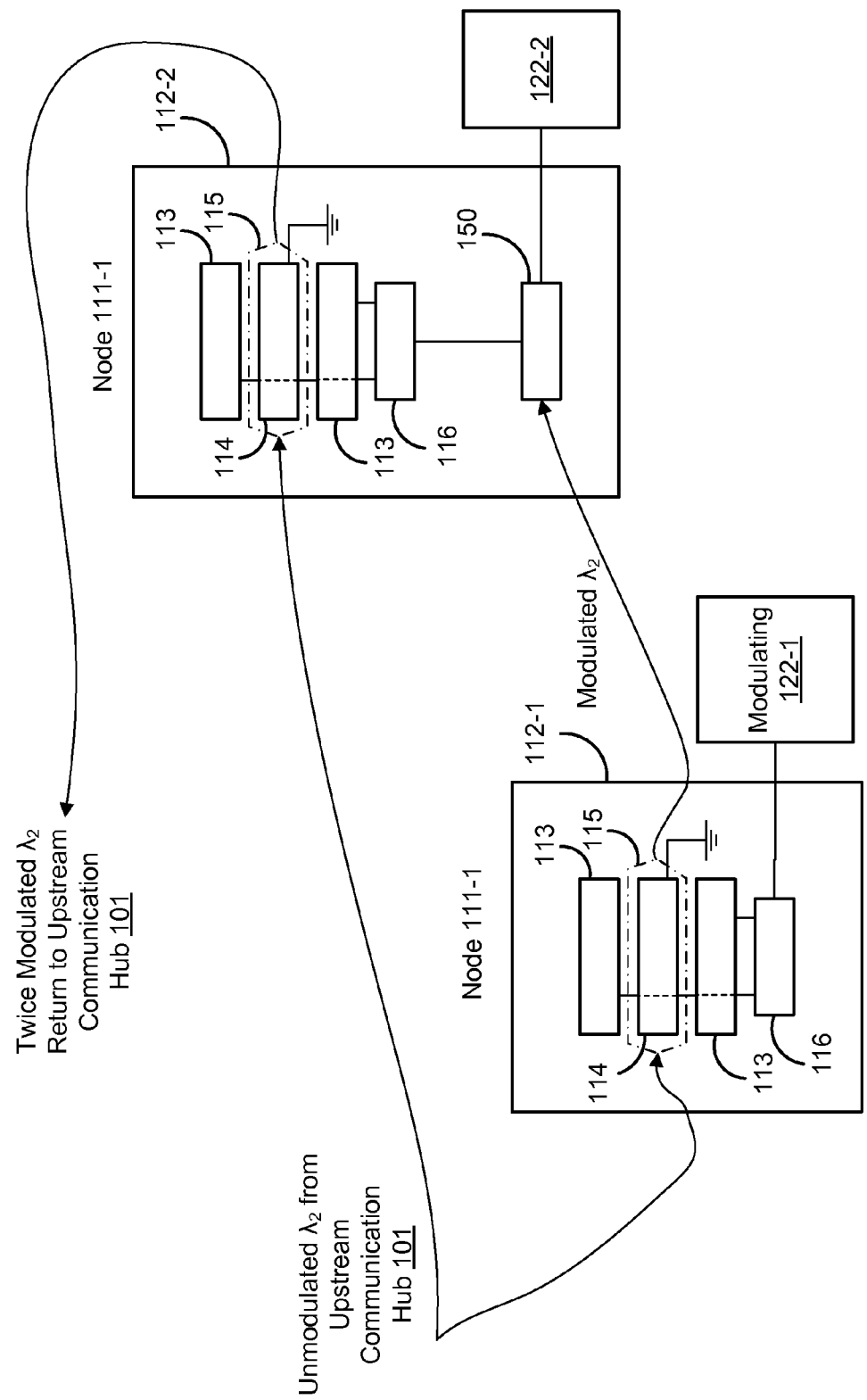

FIG. 11 is a block diagram of the modulators 112-1 and 112-2 of the nodes 111-1 and 111-2, respectively, in another exemplary implementation of cascaded nodes for upstream optical communications. In this embodiment, the unmodulated light at the wavelength $\lambda_2$ is split (e.g., via an optical element 131) before reaching the modulators 112-1 and 112-2. Thus, each modulator 112 directly receives the unmodulated light which is propagated to their respective gain mediums 114. The node 111-1 modulates the light at the wavelength $\lambda_2$ via its modulating source 122-1 and propagates it to the synchronization module 150 of the node 111-2. The synchronization module 150 then detect the light, synchronizes the generated electrical signal from the node 111-1 with its modulating source 122-2 and transfers the synchronized/modulated electrical signal to the transmitter 116 of the modulator 111-2 for modulation of the unmodulated light directed to the coupled phase shifters 114 of the modulator 112-2. The optical signal with the combined modulation of carrier wavelength $\lambda_2$ is then propagated to the communication hub 101 to convey the upstream communications of both nodes 111-1 and 111-2.

The synchronization module 150, at least in this embodiment, does not add latency due to processing or decoding of the signal. Rather, the synchronization module 150 detects the modulated light from the modulator 112-1 to recover clock and use the clock as the basis for synchronization to aggregate the data streams from the nodes 111-1 and 111-2 so that symbol transitions of the two streams are aligned. One exemplary embodiment of the synchronization module 150 is illustrated in FIG. 12.

In FIG. 12, the synchronization module 150 comprises an optical to electrical converter 302 that converts the modulated light at the wavelength $\lambda_2$ from the node 111-1 to an analog signal $s_1(t)$. The clock of the analog signal $s_1(t)$ is then recovered by the clock recovery module 303 and transferred to the D flip-flop 304-2 such that the analog signal $s_2(t)$ can be gated with the analog signal $s_1(t)$ via the D flip-flop 304-1. The re-clocked analog signals $s_1(t)$ and $s_2(t)$ are then converted to digital signals by the D/A (digital to analog) converter 306 as a four level output to the optical modulator 112-2. This four level digital output is then transferred to the transmitter 116 of the modulator 112-2 so as to QAM modulator the unmodulated light at the wavelength $\lambda_2$ propagated to the coupled phase shifters 114 of the modulator 112-2.

Figure 13:
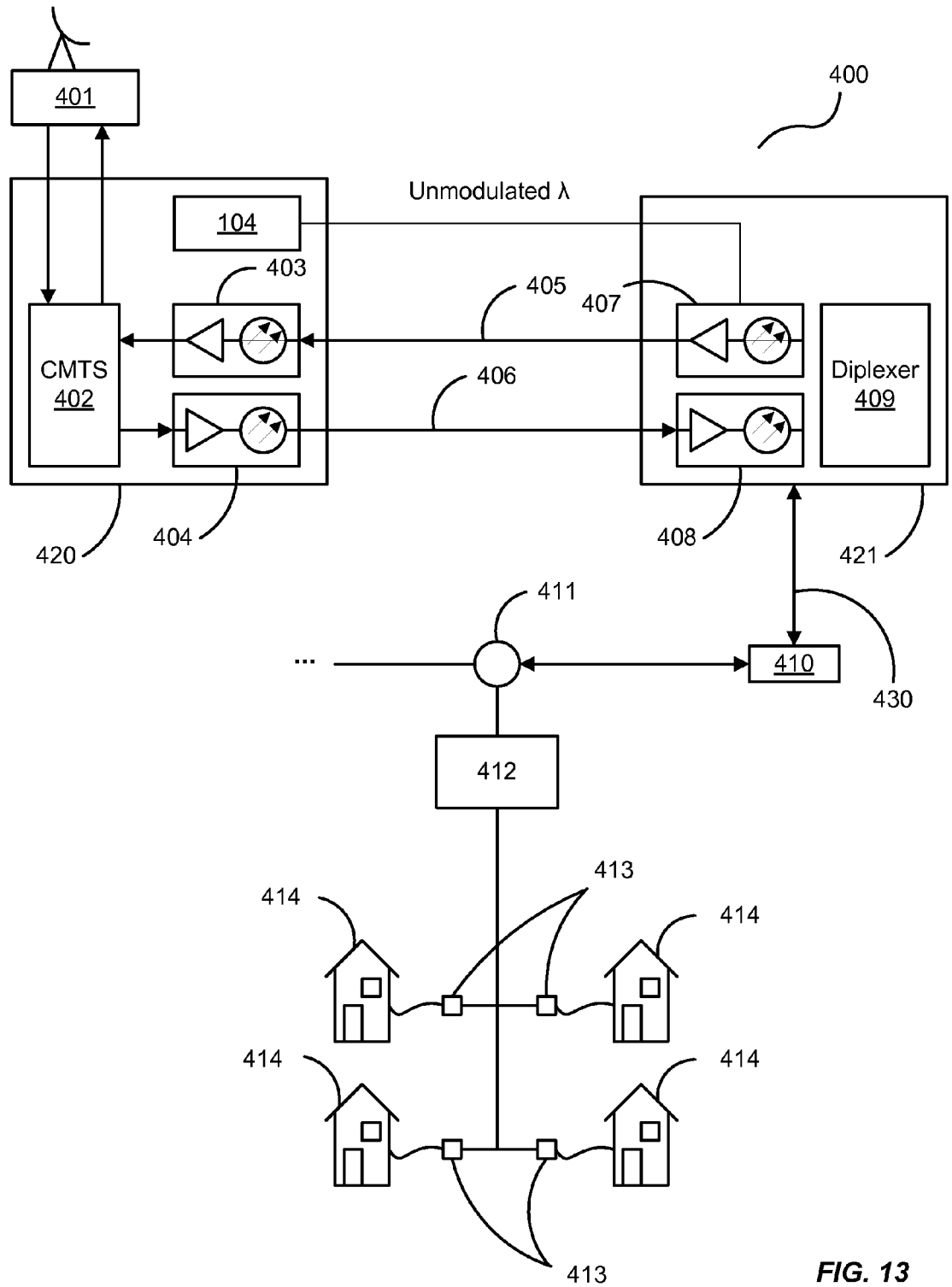
FIG. 13 is a block diagram of an exemplary cable television system employing optical systems and methods herein.

FIG. 13 is a block diagram of an exemplary communication system 500 employing the optical communication concepts described herein. For example, the optical communication concepts disclosed herein may be implemented in a cable television communication system that employs RF signaling techniques across a substantial amount of RF spectrum. An upstream link of the cable television communication system, in this embodiment, provides high speed data services being delivered over devices conforming to the Data Over Cable Service Interface Specification (DOCSIS) specification. The communication system 400 includes a headend 401 configured with a communication hub 420. The hub 420 is coupled to a node 421 via optical communication links 405 and 406.

The hub 420 includes a Cable Modem Termination System (CMTS) 402, an electrical to optical converter 403, and an optical to electrical converter 404. The node 421 is similarly configured with an optical to electrical converter 408 and an electrical to optical converter 407. The analog to digital (A/D) conversion is generally performed by the electrical to optical converters 403 and 407.

The headend 401 is generally the source for various television signals. Antennas may receive television signals that are converted as necessary and transmitted over fiber optic cables 406 to the node 421 by the hub 420. Several hubs may be connected to a single headend 401 and the hub 420 may be connected to several nodes 421 by fiber optic cable links 405 and 406. The CMTS 402 may be configured in the headend 401 or in the hub 420. The fiber optic links 405 and 406 may be driven by diode lasers, Fabry Perot lasers, distributed feedback (DFB) lasers, as a few examples.

Downstream, in homes/businesses are devices called the Cable Modems (CM; not shown). A CM acts as a host for an Internet Protocol (IP) device such as personal computer. Transmissions from the CMTS 402 to the CM are carried over the downstream portion of the cable television communication system generally from 54 to 860 MHz. Downstream digital transmissions are continuous and are typically monitored by many CMs. Upstream transmissions from the CMs to the CMTS 402 are typically carried in the 5-42 MHz frequency band, the upstream bandwidth being shared by the CMs that are on-line. However, with greater demands for data, additional frequency bands and bandwidths are continuously being considered and tested, including those frequency bands used in the downstream paths.

The CMTS 402 connects the local CM network to the Internet backbone. The CMTS 402 connects to the downstream path through the electrical to optical converter 404 that is connected to the fiber optic cable 406, which in turn, is connected to the optical to electrical converter 408 at the node 421. The signal is transmitted to a diplexer 409 that combines the upstream and downstream signals onto a single cable. The diplexer 409 allows the different frequency bands to be combined onto the same cable. The downstream channel width in the United States is generally 6 megahertz with the downstream signals being transmitted in the 54 to 860 MHz band. Upstream signals are presently transmitted between 5 and 42 MHz, but again other larger bands are being considered to provide increased capacity. The various optical modulation concepts herein may be particularly advantageous. However, the invention is not intended to be limited to any particular form of communication system.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ any level of QAM, such as 8 QAM, 32 QAM, 64 QAM, 128 QAM, 256 QAM, 4,096 QAM and 16,384 QAM. Of course, other modulation techniques such as Synchronous Code Division Multiple Access (S-CDMA) and Orthogonal Frequency Division Multiple Access (OFDMA) can be used, as desired.

Transmissions, in this embodiment, are typically sent in accordance with the DOCSIS standards. The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420.

Although generally described with respect to the communication hub 101 being "upstream" and the communication node 111 being "downstream", these terms are merely intended to be exemplary. Nor is the invention intended to be limited to cable television systems for any number of wavelengths, nodes 111, optical links 120, etc. Rather, the inventive concepts shown and described herein are merely intended to illustrate how optical communications between two components in a communication system can be optimized or otherwise improved. In this regard, the inventive concepts shown and described herein provide certain advantages over traditional optical communications. One advantage includes the signal generation and optical modulation functions being decoupled from one another. External modulators can then handle higher optical power levels leading to a high dynamic range and reduced non-linear distortion.

For example, direct modulation of diode lasers at higher frequencies is generally achieved at the expense of optical power, making data transmissions beyond 20 GHz exceptionally difficult. External modulation means that less optical power can be used and higher data transmissions can be more easily attained. And, decoupling the optical transmitter from the modulator allows one to focus optical efforts on other performance parameters including higher power, higher frequency response, narrower linewidth for better optical coherence, etc. Moreover, the external modulator can be configured to work as both an intensity modulator and as a coherent QAM modulator depending how it is driven, as shown and described above.

Another advantage of these embodiments regards the use of more sophisticated lasers. For example, analog fiber optic links can convey analog RF signals by amplitude modulating light from a diode laser. Used in cable television networks, these signals generally have optimal SNRs that approach 50 dB. However, as capacity requirements in cable television increase, the SNR of analog fiber optic has become the bottleneck in achieving higher efficiency systems because the diode lasers cannot effectively convey the larger bandwidth RF signals of the higher capacities. Thus, cable television networks seek to digitize RF signals, which uses even more bandwidth but at a lower cost because digital processing capabilities have increased substantially.

To do so, higher order QAM modulations can be used to represent many bits per symbol and digitize the entire RF spectrum available to the cable television network. This generally means that more exotic/higher power lasers are used. One such laser the DFB laser. A DFB laser is a type of diode laser, quantum cascade laser, or optical fiber laser where an active region of the device is periodically structured as a diffraction grating. The structure builds a one-dimensional interference grating (Bragg scattering) and the grating provides optical feedback for the laser. These lasers provide much faster data rates (e.g., 10 Gigabits) but they are also temperature dependent. Altering the temperature of the DFB laser causes a pitch of the grating to change due to the refractive index dependence on temperature. So, the DFB laser should be placed in a climate controlled environment such as the communication hub 101 to allow the optical communication system 100 to achieve higher optical power and/or higher capacity.

Another such laser is an external cavity laser. The external cavity laser has a narrower linewidth than DFB lasers and is suitable for coherent communications which result in higher efficiency use of bandwidth due to multiple bits per symbol.

In some embodiments, optical amplifiers such as an erbium doped fiber amplifiers may be used to provide optical amplification over an amplification medium that takes place outside the modulator to compensate for losses in the network due to fiber attenuation. Alternatively or additionally, optical amplifiers may be employed anyplace where light is split to provide additional amplification. And, although the term laser is used herein, other optical sources may be used. Generally, any optical source with narrower linewidths could be used in lieu of the laser 104.

What is claimed is:

1. A communication system, comprising: a plurality of communication nodes; a communication hub; and a bundle of optical fibers optically linking the nodes to the communication hub, wherein the communication hub includes a laser operable to propagate unmodulated laser light at a first wavelength to a first of the nodes along a first of the optical fibers in the bundle, wherein the first node is operable to first modulate the laser light with upstream communications of the first node from a first modulating signal source coupled to the first node, and to propagate the modulated laser light to a second of the nodes, wherein the second node is communicatively coupled to a second modulating signal source and to the first node, wherein the second node is operable to second modulate upstream communications from the second modulating signal source onto the modulated laser light from the first node, and to propagate the modulated laser light with the upstream communications of the first and second nodes to the communication hub at the first wavelength, and wherein the second node comprises a synchronization module operable to recover clock in the modulated light from the first node, and to combine the upstream communications of the second node with the modulated laser light from the first node by gating the upstream communications of the second node onto the modulated laser light from the first node using the recovered clock.

2. The communication system of claim 1, wherein:
the communication hub further comprises an optical transmitter that is operable to propagate downstream communications to the first and second nodes.

3. The communication system of claim 2, wherein:
the optical transmitter is further operable to propagate the downstream communications along a same optical fiber of the bundle as the upstream communications at a different carrier wavelength.

4. The communication system of claim 1, wherein:
the second node is further operable to combine the upstream communications from the second modulating signal source with the modulated laser light from the first node as a Quadrature Amplitude Modulated signal.

5. The communication system of claim 1, wherein:
the nodes are connected in series in a loop configuration.

6. The communication system of claim 1, wherein:
the communication hub is a cable television headend; and
at least one of the communication nodes is operable to provide cable television signals from the headend to a plurality of taps.

7. A method, comprising: optically linking a plurality of nodes to a communication hub;
propagating unmodulated laser light at a first wavelength to a first of the nodes along a first of the optical fibers in the bundle;
first modulating the laser light with upstream communications of the first node from a first modulating signal source coupled to the first node;
propagating the modulated laser light at the first wavelength to a second of the nodes;
second modulating the laser light at the first wavelength, at the second node, with upstream communications of the second node from a second modulating signal source coupled to the second node; propagating the modulated laser light with the upstream communications of the first and second nodes to the communication hub at the first wavelength; recovering clock, at the second node, in the modulated light from the first node; and combining the upstream communications of the second node with the modulated laser light from the first node by gating the upstream communications of the second node onto the modulated laser light from the first node using the recovered clock.

8. The method of claim 7, further comprising:
propagating downstream communications to the first and second nodes.

9. The method of claim 8, further comprising:
propagating the downstream communications along a same optical fiber of the bundle as the upstream communications at a different carrier wavelength.

10. The method of claim 7, further comprising:
combining the upstream communications from the second modulating signal source with the modulated laser light from the first node as a Quadrature Amplitude Modulated signal.

11. The method of claim 7, wherein:
the nodes are connected in series in a loop configuration.

12. The method of claim 7, wherein:
the communication hub is a cable television headend; and
at least one of the communication nodes is operable to provide cable television signals from the headend to a plurality of taps.

* * * * *